United States Patent
Harmon (10) Patent No.: US 6,856,792 B2
(45) Date of Patent: Feb. 15, 2005

(54) SELF OPERATING OPENING MECHANISM FOR USE IN A HAND-HELD ELECTRONIC DEVICE

(75) Inventor: Roger Harmon, Crystal Lake, IL (US)

(73) Assignee: Motorola, Inc., Schaumburg, IL (US)

(*) Notice: Subject to any disclaimer, the term of this patent is extended or adjusted under 35 U.S.C. 154(b) by 68 days.

(21) Appl. No.: 10/331,294

(22) Filed: Dec. 30, 2002

(65) Prior Publication Data

US 2004/0203523 A1 Oct. 14, 2004

(51) Int. Cl.[7] ............................................. H04B 1/38
(52) U.S. Cl. ................ 455/90.3; 455/575.1; 455/575.3; 455/575.4; 455/90.1; 379/433.12; 379/433.13; 379/428.01
(58) Field of Search ............................ 455/90.1, 550.1, 455/90.3, 575.1, 575.3, 575.4

(56) References Cited

U.S. PATENT DOCUMENTS

| | | | |
|---|---|---|---|
| 2,516,935 A | | 8/1950 | Weaver et al. |
| 4,484,029 A | | 11/1984 | Kenney |
| 5,485,517 A | | 1/1996 | Gray |
| 5,504,812 A | | 4/1996 | Vangarde |
| 5,649,309 A | | 7/1997 | Wilcox et al. |
| 5,850,612 A | | 12/1998 | Kulberg et al. |
| 5,857,148 A | * | 1/1999 | Weisshappel et al. ..... 455/575.3 |
| 5,933,330 A | * | 8/1999 | Beutler et al. .............. 361/814 |
| 5,966,776 A | | 10/1999 | Ona |
| 6,011,699 A | * | 1/2000 | Murray et al. ............... 361/814 |
| 6,016,347 A | | 1/2000 | Magnasco et al. |
| 6,141,569 A | * | 10/2000 | Weisshappel et al. ........ 455/572 |
| 6,230,028 B1 | | 5/2001 | Shirakawa |
| 6,466,667 B2 | * | 10/2002 | Kaschke ................. 379/433.13 |
| 6,549,789 B1 | * | 4/2003 | Kfoury ..................... 455/550.1 |
| 6,600,662 B1 | * | 7/2003 | Emmert et al. ............. 361/814 |

FOREIGN PATENT DOCUMENTS

| | | |
|---|---|---|
| DE | 3323858 A1 | 7/1983 |
| GB | 2 315 709 B | 8/2000 |
| GB | 2 351 201 A | 12/2000 |
| JP | 60-21636 A | 2/1985 |
| WO | WO 01/15331 A1 | 3/2001 |
| WO | WO 02/33205 A1 | 4/2002 |
| WO | WO 02/082783 A2 | 10/2002 |

* cited by examiner

Primary Examiner—Marceau Milord
(74) Attorney, Agent, or Firm—Lawrence Chapa (57) ABSTRACT

The present invention provides a mechanism and method for rotating at least a first and second housing elements (120, 220) of a device (100) with respect to one another. The first and second housing elements (120, 220) have a common axis of rotation (705), which is substantially perpendicular to a front surface of the device (100). The mechanism includes a tension device (300) having a first end coupled to the first housing element (120) and a second end coupled to the second housing element (220) at a point which travels around the axis of rotation along a path, where the path extends at least partly around the axis of rotation at a distance from the axis of rotation. The tension device (300) biases the rotational relationship of the first (120) and second (220) housing elements toward an opened position. The mechanism additionally includes a mechanical stop (600), that limits the further rotation of the first (120) and second (220) housing elements beyond an opened position. The mechanism still further includes an engagement member (400), which is engaged to one of the first and second housing elements (120, 220) and is releasably engaged with the other one of the first and second housing elements (120, 220). The mechanism maintains the first and second housing elements (120, 220) in a closed position, when the engagement member (400) is engaged with the other one of the first and second housing elements (120, 220).

23 Claims, 10 Drawing Sheets

SELF OPERATING OPENING MECHANISM FOR USE IN A HAND-HELD ELECTRONIC DEVICE

FIELD OF THE INVENTION

The present invention relates generally to the field of portable electronic devices and, more particularly, to a hand-held electronic device having at least a two-part housing which rotates between an opened and a closed position to facilitate usage.

BACKGROUND OF THE INVENTION

Portable electronic devices have many functions and come in a variety of different form factors. For purposes of convenience there is a general trend toward miniaturization of many types of portable electronic devices. Miniaturization generally makes it easier to carry the electronic device on one's self, including fitting the device into one's pocket/purse or attaching the device to one's belt.

While generally there is a motivation to shrink a device's form factor as much as possible, in several specific instances the extent to which the size of a device can be reduced is limited by other countervailing motivations. In some instances, the extent to which the size of a device can be reduced is limited by minimum size requirements that may be necessary for a person to conveniently use and/or interact with the device. For example, a keypad can only shrink so far before it becomes difficult to operate. A keypad generally needs to accommodate the size of the user's hands and/or fingers. Similarly, telephone handsets, which accommodate two-way communication, generally need to accommodate a microphone proximate a user's mouth and a speaker proximate a user's ear.

In order to meet these types of requirements, while otherwise attempting to minimize the devices overall size, many manufacturers have introduced devices having two part housings, which fold with respect to one another, thereby allowing the device to fold open when being used and to fold close when not being used. This allows a device, like a phone, to be more conveniently stored when not being used, and allows the device to expand to a convenient size commensurate with the usage needs.

Previous wireless communication devices have incorporated two part housings, which fold open when being used and fold close when not being used. One such design includes a flip-type or clam shell design, which generally includes two housing portions coupled together by a hinge at one end of the device. The two parts of the housing rotate with respect to one another along an axis of rotation, which is parallel to the front surface of the device or front facing.

Further, previous wireless communication devices have incorporated a two part housing, which includes two housing portions that rotate with respect to one another around an axis of rotation, which is perpendicular to the front surface of the device. In at least one design, the housing portions can rotate to an opened position in either a clockwise direction or a counter-clockwise direction. One such device is disclosed in U.S. application Ser. No. 09/826,180, entitled "Rotational Mechanism for a Wireless Communication Device", filed Apr. 4, 2001, the disclosure of which is incorporated herein by reference.

A large number of these devices being portable in nature are of the type to be used by people away from home or work. In many instances, these individuals will attempt to use the device while performing other activities, where one or both of their hands are generally full or are otherwise engaged. In absence of a self-operating mechanism which accommodates the opening of the two part housing, or in other words, the rotation of the two housing portions with respect to one another, the device generally needs to be opened by separately gripping each housing portion and repositioning/rotating the housing portions, relative to one another. This generally requires that the user free up both hands for opening the device.

For at least flip-type device designs, previous automated opening mechanisms have been developed, which reduce the effort required for opening the device. In some instances the automated opening mechanism enables the device to be opened using a single hand. Many of these devices incorporate a spring loaded mechanism held closed by a latch. By releasing the latch, the spring action causes the two portions of the housing to rotate with respect to one another into an opened position. Generally one or more physical stops are additionally incorporated to limit the rotational movement of the two parts relative to one another at one or both of the opened and closed positions. However, the same geometries present in an automated opening mechanism for a flip-type device do not directly translate to an electronic device having a two part housing, where the two housing parts rotate with respect to one another along an axis of rotation that is substantially perpendicular to the front facing of the device.

Consequently, there is a need for a self operating opening mechanism for use in a hand-held portable electronic device, including devices incorporating a two-part housing, where the two parts rotate with respect to one another along an axis of rotation that is substantially perpendicular to the front facing of the device. In addition, the desired mechanism should not compromise the stability and rigidity of the device in the opened and closed positions. It would be further beneficial if the mechanism could be conveniently operated with a single hand.

SUMMARY OF THE INVENTION

The present invention provides a mechanism for rotating at least a first and a second housing element of a device with respect to one another, where the first and second housing elements have a common axis of rotation, which is substantially perpendicular to a front surface of the device. The first housing element has a path, which extends at least partly around the axis of rotation at a distance away from the axis of rotation. The mechanism includes a tension device, a mechanical stop and an engagement member.

The tension device has a first end coupled to the first housing element, and a second end coupled to the second housing element. The second end of the tension device is coupled to the second housing element at a point which travels around the axis of rotation along said path of the first housing element, as the first housing element and the second housing element rotate with respect to one another.

The mechanical stop limits the relative rotational movement of the first and second housing elements, when the first and second housing elements are at or near a rotatably opened position.

The engagement member is engaged to one of the first and second housing elements and is releasably engaged with the other one of the first and second housing elements. The engagement member selectively limits the relative rotational movement of the first and second housing elements, when the first and second housing elements are at or near a rotatably closed position.

In at least one embodiment, the second end of the tension device is moved further away from the first end of the tension device along the path, as the first and second housing elements are rotated toward a closed position.

In at least a further embodiment, the path in addition to including a first portion, which extends partly around said axis of rotation, further includes a second portion, which extends along at least a part of the length of the first housing element, away from the axis of rotation. In a still further embodiment the second portion of the path, which extends along at least a part of the length of the first housing element, has a length that is longer than the unstretched length of the tension device.

The present invention further provides a method for opening a first and a second housing element of a hand-held device using a self-opening mechanism. More specifically, the method includes preloading a tension device having a first end coupled to a first housing element and a second end coupled to a second housing element, wherein the tension device extends along a path of travel, by rotating the first housing element and the second housing element toward a closed position. The path of travel extends at least partly around a common axis of rotation at a distance away from the common axis of rotation, where the axis of rotation is substantially perpendicular to a front surface of the device.

The rotational movement of the first and second housing elements is limited, when the first and second housing elements are at or near a rotatably closed position, by applying a holding force applied by an engagement member. The first and second housing elements are then released, thereby enabling the relative rotation of the first and second housing elements toward an opened position as a result of the force exerted by the preloaded tension device. When the first and second housing elements are at or near a rotatably opened position, the further rotational movement of the first housing element relative to the second housing element is limited.

In at least one of the embodiments, releasing the first and second housing elements includes applying a release force to the engagement member, which biases the engagement member in a direction that reduces the holding force below a level where the force applied by the preloaded tension device can overcome the holding force.

In a further embodiment, releasing the first and second housing elements includes applying an opening force to at least one of the first and second housing elements, in the direction of rotation, which in addition to the force applied by the preloaded tension device overcomes the holding force applied by the engagement member.

These and other object, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
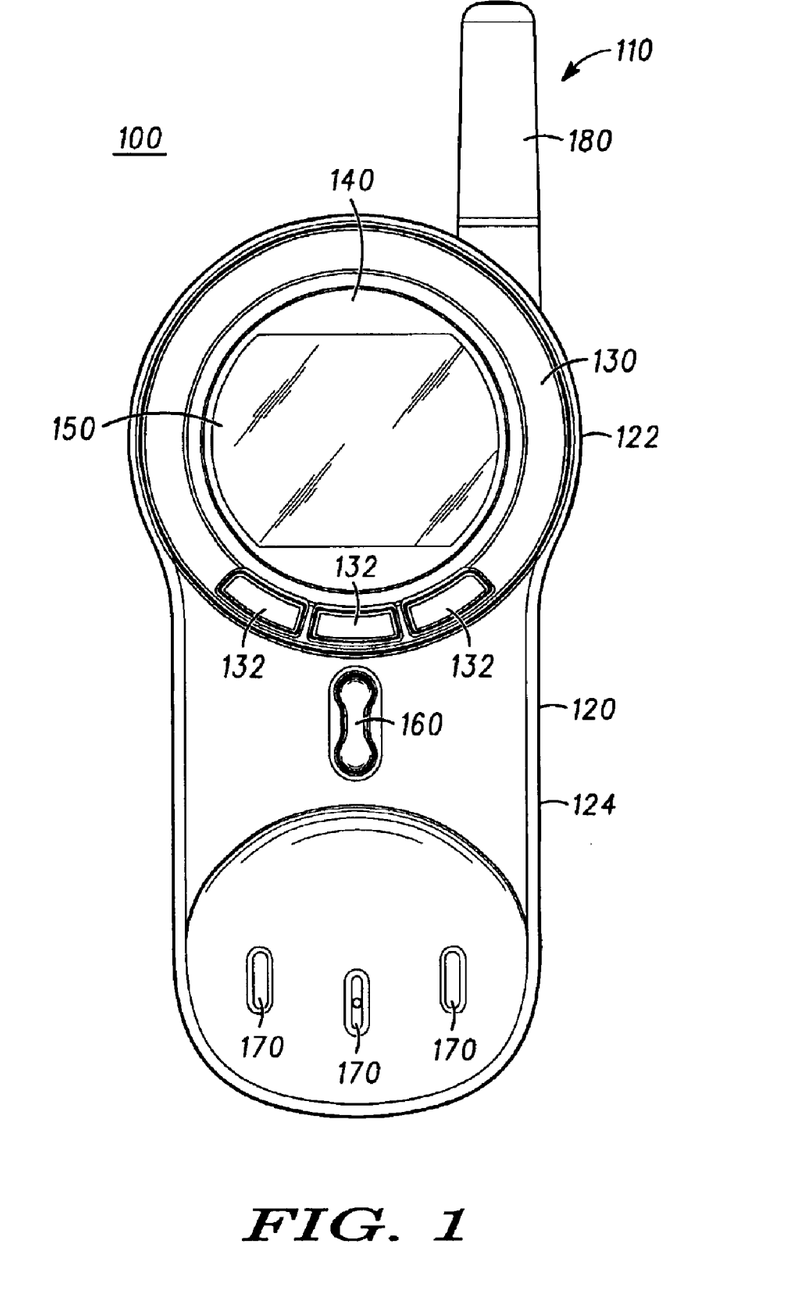
FIG. 1 is a front plan view of a radiotelephone in a closed position.

Referring to FIG. 1, there is provided a collapsible radiotelephone 100 in a closed position 110. The radiotelephone 100 has wireless communication capabilities and, thus, may be used to communicate with wireless infrastructure, such as cellular base stations, regional and local wireless transponders, and wireless local area networks. The radiotelephone 100 described herein is a representation of the type of wireless communication device that may benefit from the present invention. However, it is to be understood that the present invention may be applied to any type of hand-held or portable electronic device including, but not limited to, the following devices: radiotelephones, cordless phones, paging devices, personal digital assistants, portable computers, pen-based or keyboard-based handheld devices, remote control units, an audio player (such as an MP3 player) and the like. Accordingly, any reference herein to the radiotelephone 100 should also be considered to apply equally to other hand-held or portable electronic devices.

For the preferred embodiment shown in FIG. 1, the radiotelephone 100 has at least two housing elements including an upper housing 120 having a generally elongated and planar shape. The upper housing 120 has an upper circular portion 122 at one end and an upper extending portion 124 extending away from the upper circular portion. In the closed position 110, as illustrated, the upper circular portion 122 and the upper extending portion 124 are rotated so as to be adjacent to similar matching elements corresponding to a lower housing, which are more clearly illustrated in FIG. 2. The radiotelephone 100 further includes an external antenna 180, which may be provided to enhance the wireless communication capabilities of the radiotelephone 100.

Components of the radiotelephone 100 are positioned near the upper circular portion 122 including an interchangeable cover 130, a locking piece 140, and a display 150. The interchangeable cover 130 has a ring-like shape that may be attached to, and detached from, the radiotelephone 100. The interchangeable cover 130 may include cover selection buttons 132 and/or indicator lights (not shown) to provide additional functionality to the radiotelephone 100. For example, the preferred embodiment provides three cover selection keys 132: a left selection key, and right selection key and a menu key therebetween. The display 150 may be any type of output device that provides a convenient display of text and/or graphics to the user. Preferably, the display 150 is a liquid crystal display having a backlighting system to illuminate the display when lighting conditions are insufficient for proper viewing by the user. The locking piece 140 locks certain components of the radiotelephone 100 together, while simultaneously allowing relative rotational movement of the upper housing with respect to the lower housing. The locking piece 140 also functions as a display lens to protect the display 150 from undesirable, foreign matter.

The extended portion 124 of the upper housing 120 may include upper housing selection buttons 160 and speaker apertures 170. Although many different selection buttons may be provided on the upper housing 120, only one upper housing selection button 160 is shown in FIG. 1 by way of example. In this particular embodiment the selection button is similar to a rocker button having a two-direction "scrolling" function. The upper housing 120 of the present invention may include one or more selection buttons (such as selection buttons 132 and 160) for various types of features including, but not limited to, volume control, menu control, call answering, call termination, caller identification, phone book control, voicemail control, e-mail/messaging control, network browsing, power on/off, and the like. The speaker apertures 170 direct sounds generated by a speaker or other type of audio output device to the user.

In the illustrated embodiment, the upper housing 120 principally functions as a cover, which as noted above can also include some functional electronic components, such as selection buttons 132 and 160, a speaker, or indicator lights. However, in the illustrated embodiment, a majority of the functional electronic components are included as part of the lower housing, which is also referred to as the body.

Figure 2:
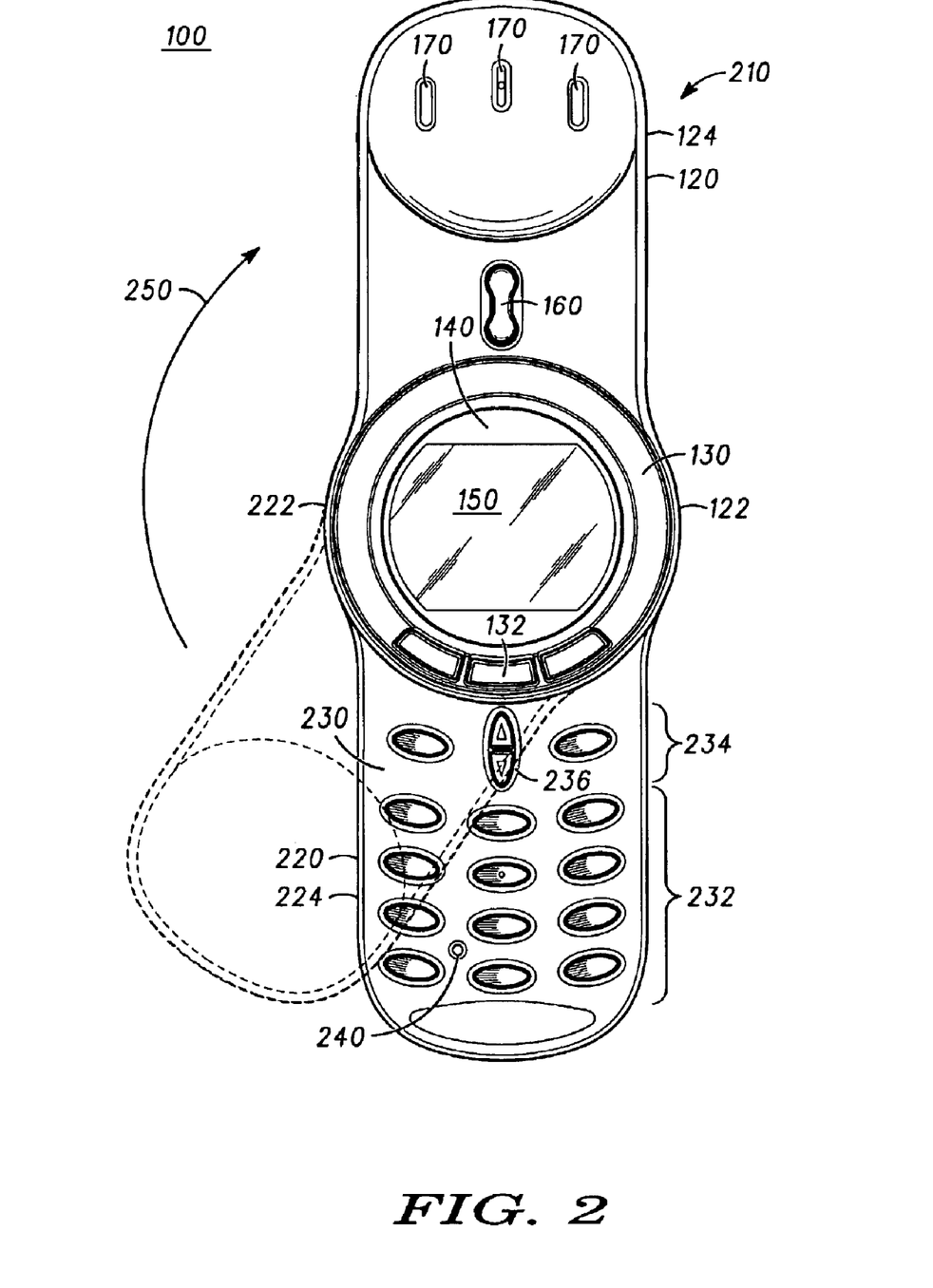
FIG. 2 is a front plan view of the radiotelephone of FIG. 1 in an opened position, as well as one alternative intermediate position.

Referring to FIG. 2, the preferred embodiment of the radiotelephone 100 is shown in an opened position 210. The portions of the radiotelephone 100 that become visible in the opened position 210 include a lower housing 220, a keypad 230 and a microphone aperture 240. When viewed from the front, the lower housing of the preferred embodiment has a substantially similar profile to the upper housing 120. Correspondingly, the lower housing includes a lower circular portion 222 and a lower extending portion 224. In the opened position 210, the upper circular portion 122 of the upper housing 120 is adjacent to, and positioned above, the lower circular portion of the lower housing 220. On the other hand, the upper extending portion 124 is positioned away from the lower housing. For example, as shown in FIG. 2, the upper extending portion 124 is oriented in an opposite direction to the lower extending portion 124 on opposite sides of the upper and lower circular portions 122 and 222. The keypad 230 may include any layout of keys that provide convenient operation of the radiotelephone 100 by the user. The microphone aperture 240 directs sounds received from the user or other local sounds to a microphone or other type of audio input device.

The preferred embodiment includes a standard layout of alphanumeric and menu control for operation of the radiotelephone 100. As shown in FIG. 2, the keypad 230 includes twelve standard keys 232 (namely, 0 through 9, # and *) as well as three lower housing selection buttons 234. However, the radiotelephone 100 may include a larger grouping of keys, such as a QWERTY keyboard, if a device having a larger form factor or smaller individual keys is desired. Although not shown in FIG. 2, the keypad 230 may also include a cursor or graphical pointing device such as a joystick, touch pad or track ball. Also, similar to selection buttons 132 and 160 described, above, the lower housing selection buttons 234 may be used for various features including, but not limited to, volume control, menu control, call answering, call termination, caller identification, phone book control, voicemail control, e-mail/messaging control, network browsing, power on/off, and the like.

The preferred embodiment shown in FIGS. 1 and 2 includes at least two functional positions, namely an opened position 210 (FIG. 2), and a closed position 110 (FIG. 1). Generally, the opened position 210 and the closed position 110 activate functions of the radiotelephone 100 such as answering an incoming call and/or initiating a new call, or terminating an existing call. Other relative rotational positions may define alternative functions, and in some cases may select or define functions not specific to radiotelephones. The relative rotational position of the housing may also affect the functionality of, the cover selection buttons 132, upper housing selection button 160, and lower housing selection buttons 234. For example, the selection buttons 132, 160, 234 and 236 may each activate a different function dependent upon the position of the upper housing 120 relative to the lower housing 220.

Figure 3A:
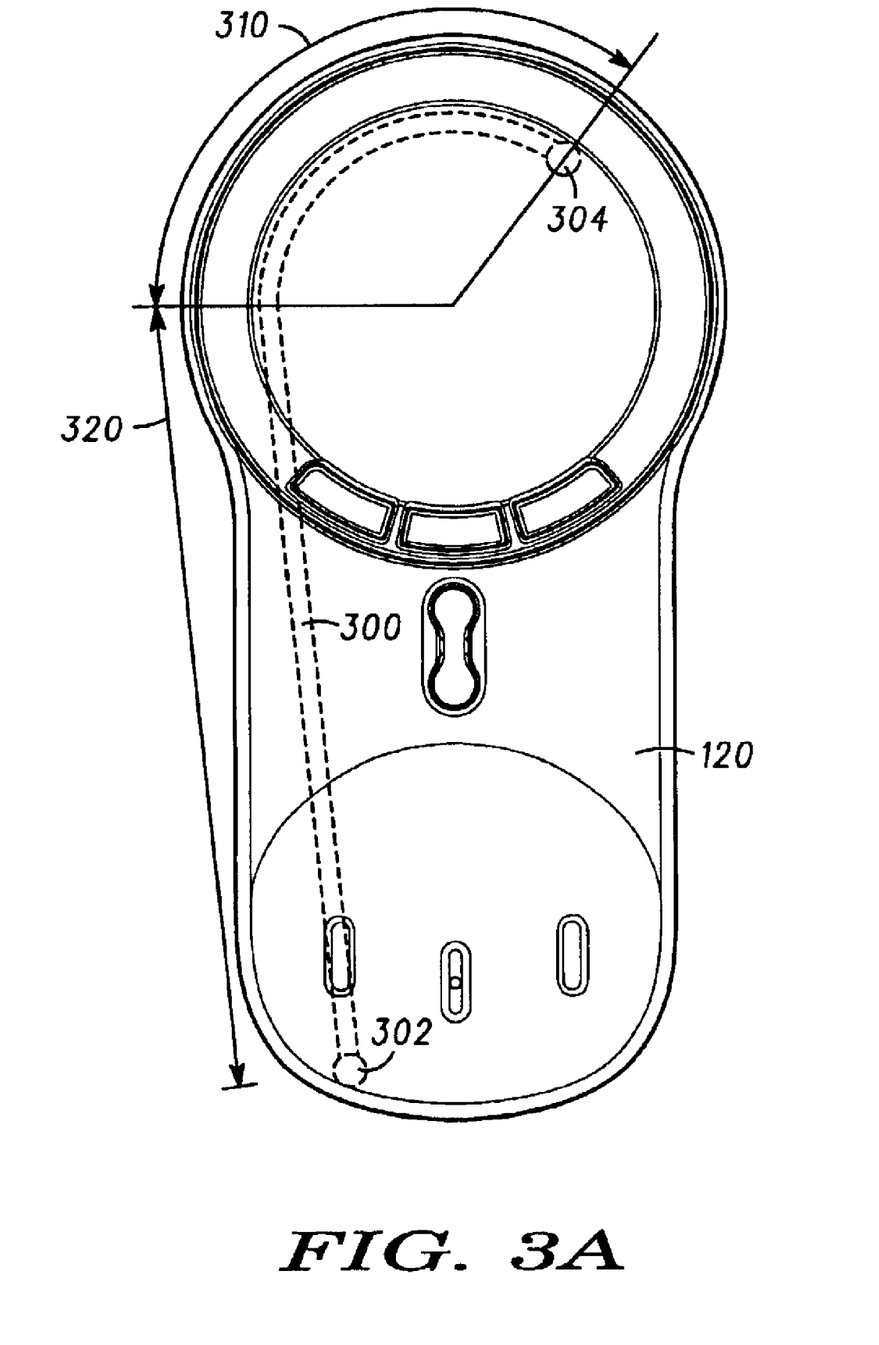
FIGS. 3A–3C are sequential plan views of the radiotelephone of FIGS. 1 and 2 having two housing elements, that move between an opened and a closed position, with the position of a tension device and corresponding end points and travel path of the tension device highlighted.
Figure 3B:
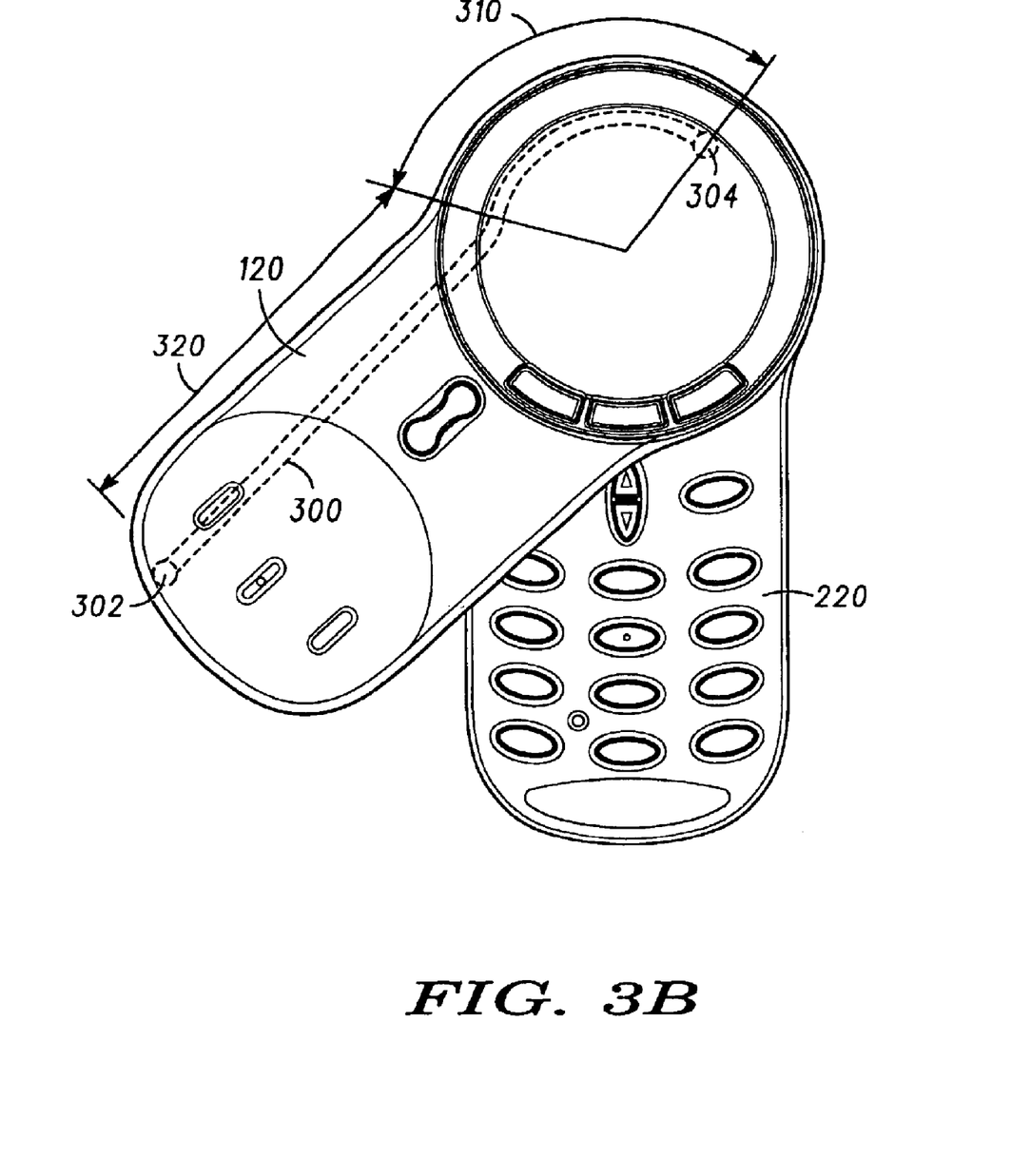
Figure 3C:
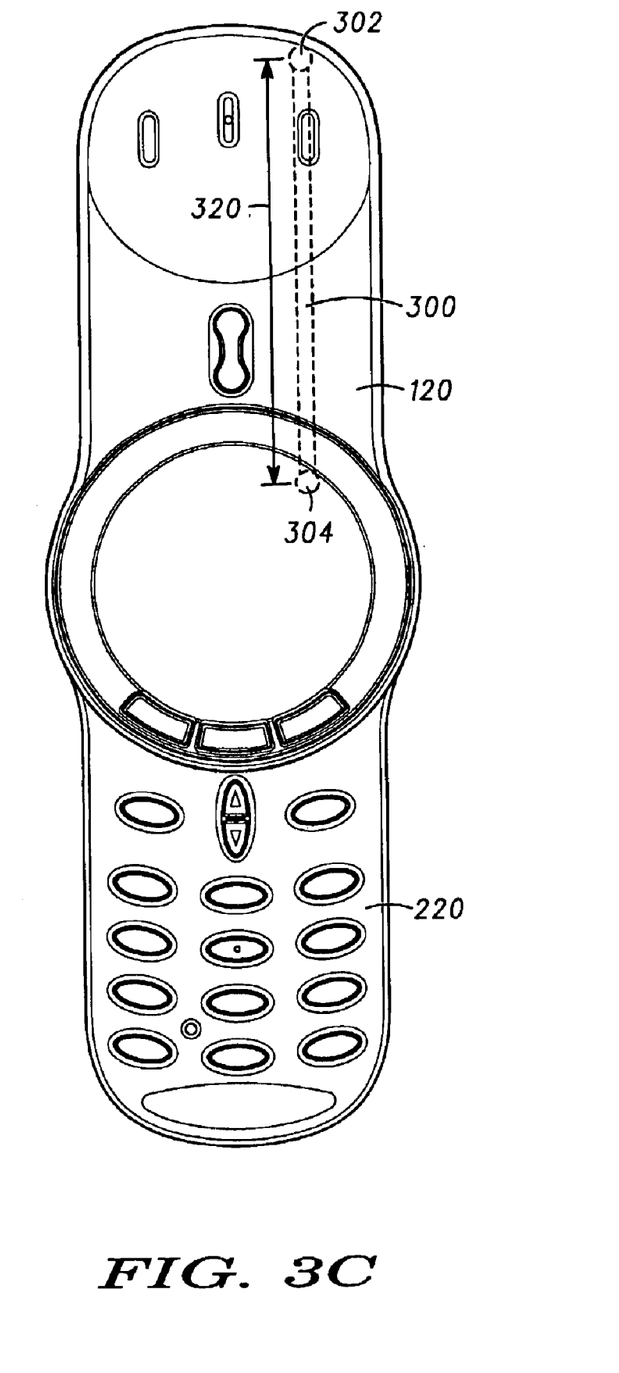

In order to facilitate movement between an opened position 210 and a closed position 110, the radiotelephone 100 includes a self operating opening mechanism for rotating the upper housing 120 relative to the lower housing 220. FIGS. 3A–3C illustrate sequential plan views of portions of the radiotelephone of FIGS. 1 and 2 having two housing elements, that move between an opened and a closed position, with the position of a tension device and corresponding end points and travel path of the tension device highlighted.

More specifically, FIG. 3A illustrates the upper housing 120 and the lower housing 220 in a rotatably closed position. FIG. 3C illustrates the upper housing 120 and the lower housing 220 in a rotatably opened position. FIG. 3B illustrates the upper housing and the lower housing 220 between a rotatably opened position and a rotatably closed position.

Highlighted in each of FIGS. 3A–3C is a representation of the position of the end points, and the corresponding travel path, of a tension device relative to the upper and lower housing, as the upper and lower housing rotate with respect to each other. One end 302 of the tension device 300 is coupled to the upper housing 120, and the other end 304 of the tension device 300 is coupled to the lower housing 220.

In at least one embodiment, the tension device 300 is a spring which extends between the two end points 302 and 304, along a path having a first portion 310, which extends at least partly around an axis of rotation, and a second portion 320, which extends along the length of the upper housing 120. In alternative embodiments, the second portion of the path could alternatively extend along a portion of the length of the lower housing 220, this can be the case, where the end points of the tension device are each coupled to alternative ones of the upper and lower housings.

In at least one embodiment, the portion of the path extending along the length of the upper housing 120 has a length, that is longer than the unstretched length of the tension device 300. This results in the tension device 300 exerting a force, which biases the upper and lower housing toward an opened position, in a direction which minimizes the path distance including the path distance associated with the portion of the path 310 that extends at least partly around the axis of rotation, regardless of the amount of the path length that is associated with portion of the path 310 that extends at least partly around the axis of rotation. In the illustrated embodiment, the portion of the path 310 that extends at least partly around the axis of rotation is minimized when the upper and lower housings are in a rotatably open position relative to one another, as shown in FIG. 3C.

In the illustrated embodiment, the upper housing 120 and lower housing 220 are rotated back to a closed position by manually applying an external closing force, which is greater than the tension force of the tension device 300. When the upper housing 120 and lower housing 220 are at or near a closed position, a latch 400 or engagement member limits the relative rotation of the upper housing 120 and lower housing 220 back toward an opened position. The latch 400 is illustrated as part of the perspective view of the first and second, or upper 120 and lower 220 housing elements of a radiotelephone, illustrated in FIG. 4.

Figure 4:
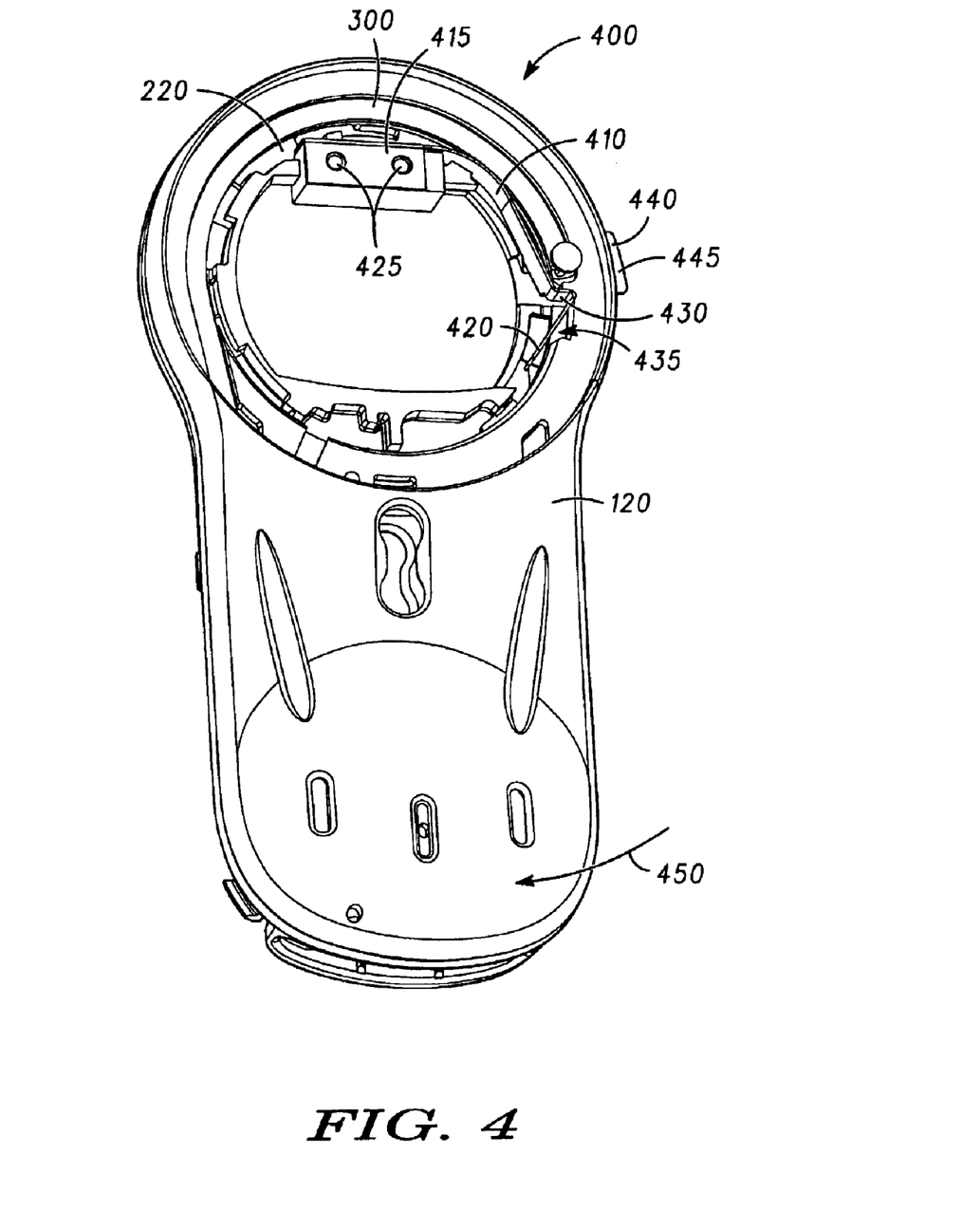
FIG. 4 is a perspective view of the first and second housing elements of the radiotelephone of FIGS. 1–3 in a closed position with tension device and engagement member illustrated.

In the illustrated embodiment the latch 400 includes a leaf spring 410 having a first end 415, which is firmly engaged to the lower housing 220, and a second end 420, which is selectively releasably engaged to the upper housing 120. In an alternative embodiment, the latch 400 has a first end 415 firmly engaged to the upper housing 120, and a second end 420 releasably engaged to the lower housing 220. Still further, in other embodiments, both the first end 415 and the second end 420 are releasably engaged to respective ones of the upper 120 and lower 220 housings.

In the illustrated embodiment, the leaf spring 410 is firmly engaged at two points 425 proximate the first end 415, which are displaced a distance away from a contact point 430, where the leaf spring 410 selectively engages the upper housing 120. The leaf spring 410 engages the upper housing 120 within a notch 435 formed within the upper housing 120, when the upper housing 120 and the lower housing 220, are at or near a rotationally closed position. The leaf spring 410 is contoured and/or bent to match one of the edge facings of the notch 435.

The leaf spring 410 is biased toward an engagement position, which produces a frictional holding force, as well as physically impeding the rotational movement of the upper housing 120 relative to the lower housing 220. In order to release the upper housing 120, the end of the leaf spring 410 needs to be deflected away from or out of the notch 435. In the illustrated embodiment, there are at least two ways for the leaf spring 410 to be deflected away from or out of the notch 435.

The first way includes a push button 440, which is coupled to and/or integrated with the leaf spring 410 proximate the second end 420. The push button is more clearly illustrated in FIG. 6. The push button 440 is positioned so as to be accessible to the user, via an exposed portion 445, which can be depressed by the user. When the push button 440 is depressed by the user, the leaf spring 410 is deflected by the push button 440 out of the notch 435. In at least one embodiment, the push button is positioned so as to be readily accessible by a user's thumb or finger, while the device is generally held within the palm of the user's hand.

The second way includes the manual application of a force 450, to at least one of the upper 120 and lower 220 housings, which rotates the upper housing 120 relative to the lower housing 220. When the applied force in combination with the opening force applied by the tension device 300 exceeds a level of force required to sufficiently deflect the leaf spring 410 out of the notch 435 and overcome the frictional force applied by the leaf spring 410, the latch 400 becomes disengaged and the tension device 300 can complete the respective rotation of the upper 120 and lower 220 housings elements toward an opened position.

Figure 5:
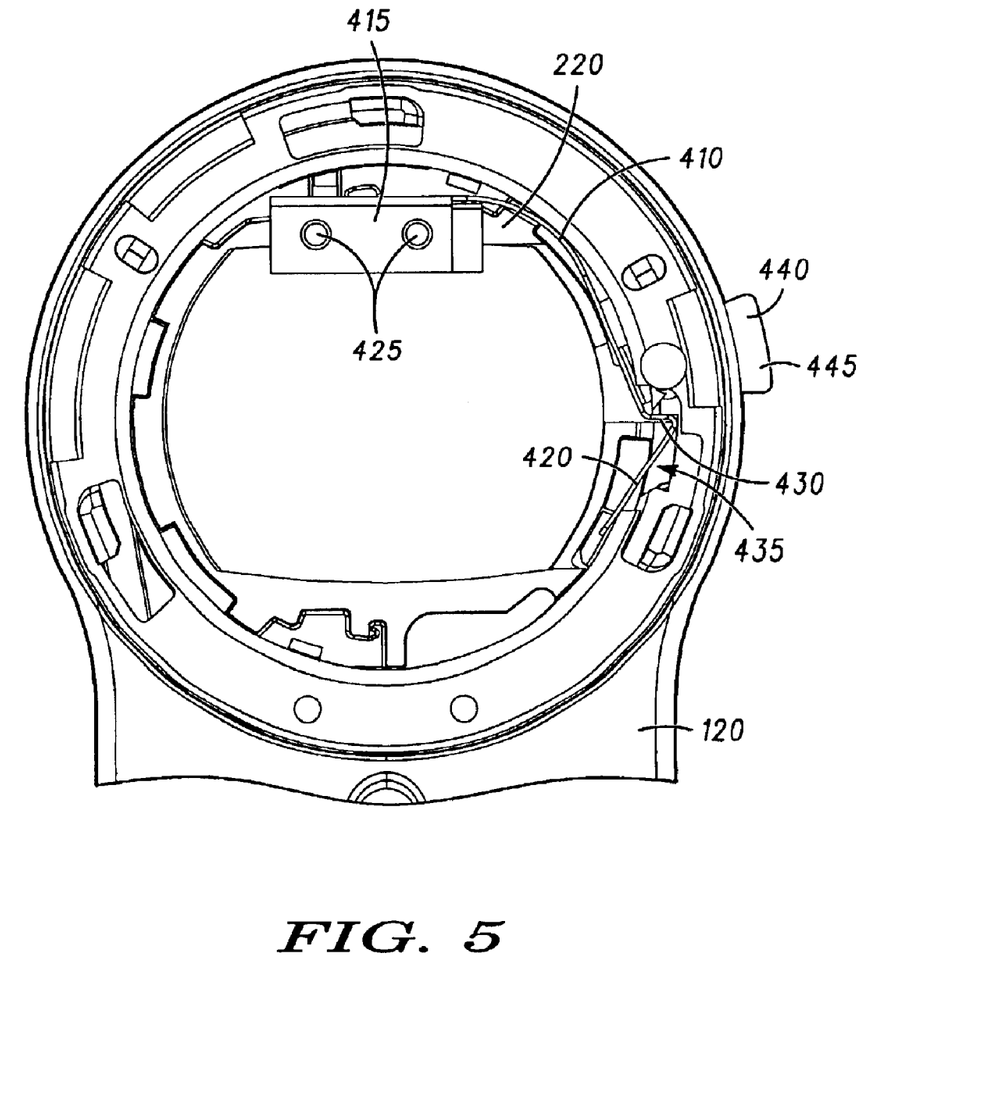
FIG. 5 is a partial plan view of the first and second housing elements of the radiotelephone in a closed position with tension device and engagement member illustrated in FIG. 4.

FIG. 5 illustrates an enlarged partial plan view of the first and second housing elements of the radiotelephone in a closed position with tension device and engagement member illustrated in FIG. 4.

Figure 6:
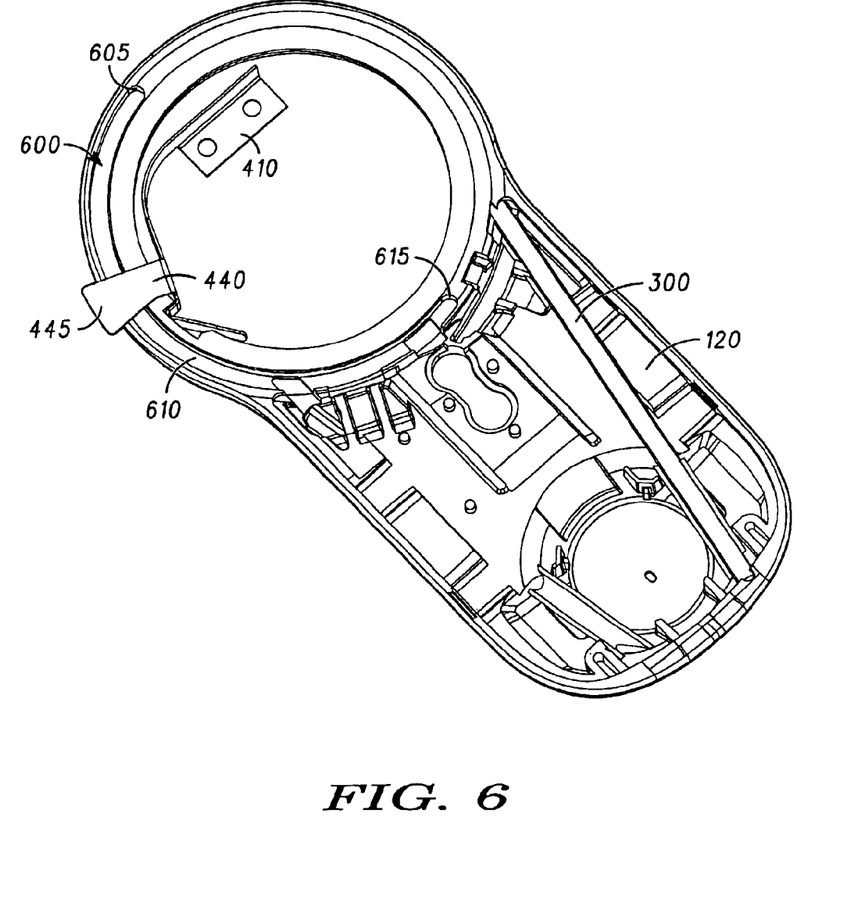
FIG. 6 is a perspective view of one of the first and second housing elements with engagement member and tension device, viewed from the back facing, illustrating at least a portion of the mechanical stop.

FIG. 6 illustrates a perspective view of one of the upper housing 120 with engagement member 400 and tension device 300, viewed from the back side facing. From the back side facing vantage at least a portion of the mechanical stop 600, as provided in the present embodiment is illustrated. In the illustrated embodiment, the portion of the mechanical stop corresponding to the upper housing 120 includes an end wall 605 of a channel 610. FIG. 6 additionally more clearly illustrates the push button 440 coupled to and/or integrated with the leaf spring 410.

Figure 7:
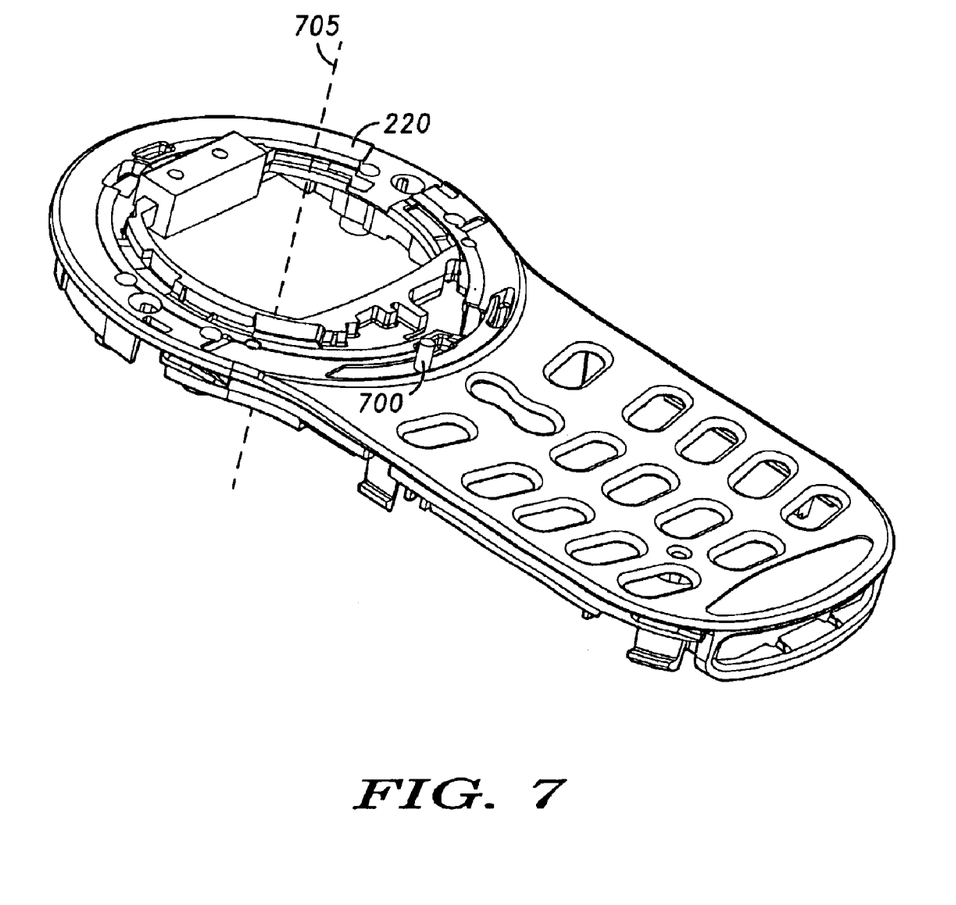
FIG. 7 is a perspective view of the other one of the first and second housing elements, not illustrated in FIG. 6, illustrating at least a portion of the mechanical stop.

FIG. 7 illustrates a perspective view of the lower housing 220, which illustrates at least a further portion of the mechanical stop 600, partially illustrated in FIG. 6. More specifically, the lower housing 220 includes a post 700. The post is positioned so as to travel within the channel 610, illustrated in FIG. 6, through a varying degree of relative rotation, when the upper housing 120 and lower housing 220 are brought together. The channel ends, thereby restricting further rotation of the upper housing 120 and the lower housing 220 relative to one another, when the upper housing 120 and the lower housing 220 are at or near a rotatably opened position. The other end 615 of the channel ends, proximate to where the post 700 would be positioned in the channel, when the upper housing 120 and the lower housing 220 are at or near a rotatably closed position.

By intersecting the post 700 with the end of the channel 600, further rotation of the housing elements is restricted. It is possible to dampen the movement immediately prior to reaching the end wall 605 of the channel 600 by narrowing the channel width or making the channel depth shallower. It is further possible that a small spring could be positioned within the channel 600 so as to be compressed between the post 700 and the end wall 605 of the channel 600, immediately prior to the end 605 of the channel 600, to act as a shock absorber, so as to dampen the force of any contact, when the post 700 and the end wall 605 intersect.

While the illustrated embodiment has made use of a spring 300 as the tension device, it will be readily clear to one skilled in the art that other types of tension devices could be used. Furthermore the manner in which the tension device applies a force to the upper 120 and lower 220 housings could similarly involve alternative approaches. For example, a spring loaded pulley might be used to supply the necessary force, which might allow for greater flexibility in the placement of the tension device.

Additionally illustrated in FIG. 7 is an axis of rotation 705, which extends through the front and back facing of the lower housing 220. The axis of rotation 705 similarly extends through the front and back facing of the upper housing 120.

Figure 8:
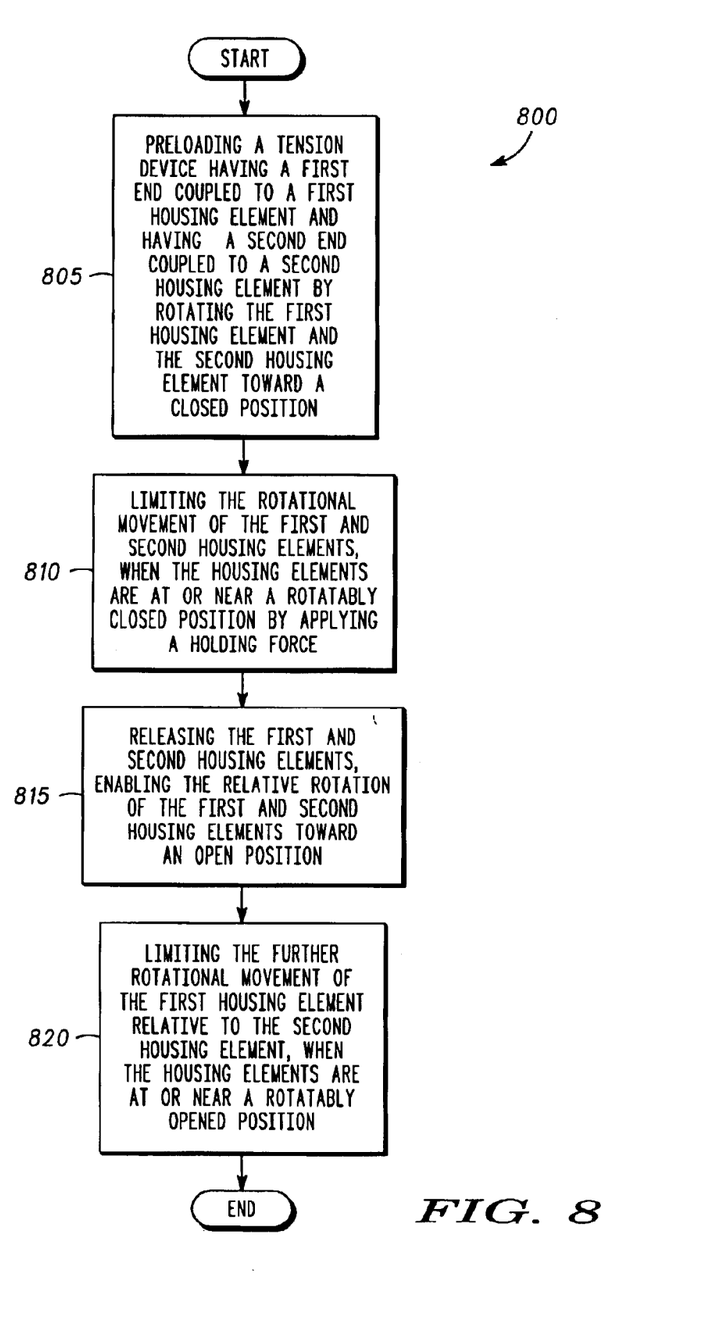
FIG. 8 is a flow diagram of a method for opening a first and a second housing element of a hand-held device using a self-opening mechanism, in accordance with at least one embodiment of the present invention.

FIG. 8 illustrates a flow diagram of a method for opening a first and a second housing element of a hand-held device using a self-opening mechanism, in accordance with at least one embodiment of the present invention. Generally, as illustrated in FIG. 8, the method 800 includes preloading 805 a tension device having a first end coupled to a first housing element and having a second end coupled to a second housing element by rotating the first and second element toward a more closed position from a more opened position.

In the embodiment illustrated in FIGS. 1–7, given the nature of the coupling of the tension device, the housing elements are rotatable from a more opened position toward a more closed direction in a counter-clockwise direction. However, one skilled in the art could readily recognize, that the geometries could be mirrored horizontally, which would allow for the housing elements to move from an opened position toward a closed position in a clockwise direction. It is further noted, that generally, the housing elements rotate toward a more opened position in a direction opposite to the direction that the housing elements rotate, when moving toward a more closed position.

After the tension device is preloaded 805, and when the housing elements are at or near a rotatably closed position, the rotational movement of the housing elements are limited by applying 810 a holding force. In the embodiment illustrated in FIGS. 1–7, a holding force is applied by the latch 400, where the end 420 of the leaf spring 410 engages the notch 435. One skilled in the art will readily recognize that other structures, which are suitable for producing a holding force, are similarly possible without departing from the teachings of the present invention.

The first and second housing elements are then released 815, thereby enabling the relative rotation of the first and second housing elements toward an opened position. In the at least one illustrated embodiment noted above, the first and second housing elements, corresponding to the upper housing 120 and the lower housing 220, can be released when the end 420 of the leaf spring 410 is disengaged from said notch 435. Alternatively, the upper housing 120 and the lower housing 220 can be released when an external manual opening force is initially applied to one or both of the first and second housing elements which, when added to the force applied by the preloaded tension device, overcomes the holding force applied to the first and second housing elements.

The tension device then acts upon both of the first and second housing elements to rotate the two toward a rotatably open position. The method then provides for the limiting 820 of the further rotational movement of the first housing element relative to the second housing element, when the housing elements are at or near a rotatably opened position. In at least some embodiments, the further relative rotation is limited by a mechanical stop, which includes corresponding physical structures associated with respective ones of the first and second housing elements, that intersect. In at least one embodiment, the corresponding physical structures are a post 700 and the end wall 605 of a channel 600.

Generally, in the preferred embodiment, the opened and closed position differ from one another by approximately 180°. However in some instances, the difference can be more or less. For example, in some instances a difference less than 180° might allow the radiotelephone to follow more closely the contour of a user's face, where one end of the opened phone, which produces an audio output, is proximate to the user's ear, and where the other end of the opened phone, which receives an audio input, is proximate the user's mouth.

The method additionally provides for the first and second housing elements to be returned to a non-rotated position. In at least some instances, this requires the manual application of a force by the user, which counteracts the force produced by the tension device. In at least the illustrated embodiment, returning the first and second housing element to a closed position serves to preload the tension device.

While the, above described, self operating opening mechanism for use in a hand-held electronic device is completely mechanical, alternative approaches could introduce electro-mechanical elements such as motors or linear actuators without departing from the scope of the present invention. However, one of the advantages to an all mechanical approach is that the all mechanical opening mechanism will not need to draw energy from a self contained power source, like a battery, when the mechanism is being used to open or close the device. This allows more of the energy stored in the power source to be used for the other operations of the device, such as the transmission and reception of a wireless signal.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A mechanism for rotating at least a first and a second housing element of a device with respect to one another, where the first and second housing elements have a common axis of rotation, which is substantially perpendicular to a front surface of the device, the first housing element including a path, which extends at least partly around said axis of rotation at a distance away from the axis of rotation, said mechanism comprising:

a tension device having a first end coupled to the first housing element, and a second end coupled to the second housing element at a point which travels around the axis of rotation along said path of the first housing element, as the first housing element and the second housing element rotate with respect to one another;

a mechanical stop, which limits rotational movement, when the first and second housing elements are at or near a rotatably opened position; and an engagement member, engaged to one of the first and second housing elements and releasably engaged with the other one of the first and second housing elements, which limits rotational movement, when the first and second housing elements are at or near a rotatably closed position.

2. A mechanism in accordance with claim 1 wherein said mechanical stop includes corresponding physical structures, associated with each of the first and second housing elements, which intersect, when the first and second housing elements are at or near a rotatably opened position.

3. A mechanism in accordance with claim 1 wherein said path in addition to including a first portion, which extends partly around said axis of rotation, further includes a second portion, which extends along at least a part of the length of the first housing element and away from the axis of rotation.

4. A mechanism in accordance with claim 3 wherein the second portion of the path which extends along at least a part of the length of the first housing element, has a length, that is longer than the unstretched length of the tension device.

5. A mechanism in accordance with claim 1 wherein the second end of the tension device is moved further away from the first end of the tension device along the path, including the portion of the path which travels around the axis of rotation, as the first and second housing elements are rotated toward a closed position.

6. A mechanism in accordance with claim 1 wherein said tension device includes a spring.

7. A mechanism in accordance with claim 1 wherein the corresponding physical structures of the mechanical stop include a post and a wall.

8. A mechanism in accordance with claim 7 wherein the wall is an endwall of a channel located in one of the first and second housing elements.

9. A mechanism in accordance with claim 1 wherein the mechanical stop includes a shock absorber, which is engaged by both of the corresponding physical structures prior to the corresponding physical structures intersecting with one another.

10. A mechanism in accordance with claim 1 wherein the engagement member is a spring biased frictional engagement member.

11. A mechanism in accordance with claim 10 wherein the spring biased frictional engagement member includes a leaf spring fixed at a first end to one of the first and second housing elements, and frictionally engages at a second end the other one of the first and second housing elements.

12. A mechanism in accordance with claim 11 wherein the spring biased frictional engagement member additionally includes a latch, which when depressed applies a force against the spring biased frictional engagement member thereby biasing the second end of the leaf spring away from the other one of the first and second housing elements.

13. A mechanism in accordance with claim 1 wherein the path of the tension device extending at least partly around the axis of rotation at a distance away from the axis of rotation defines an area within which a display is located.

14. A mechanism in accordance with claim 1 wherein said device is a hand-held device.

15. A mechanism in accordance with claim 1 wherein said device is an electronic device.

16. A mechanism in accordance with claim 15 wherein said electronic device is a wireless communication device.

17. A method of opening a first and a second housing element of a hand-held device using a self-opening mechanism comprising:

preloading a tension device having a first and coupled to a first housing element and having a second end coupled to a second housing element, wherein the tension device extends along a path of travel, which extends at least partly around a common axis of rotation at a distance away from the common axis of rotation. which is substantially perpendicular to a front surface of the device, by rotating the first housing element and the second housing element toward a closed position;

limiting the rotational movement of the first and second housing elements, when the first and second housing elements are at or near a rotatably closed position by applying a holding force applied by an engagement member;

releasing the first and second housing elements, thereby enabling the relative rotation of the first and second housing elements toward an open position as a result of the force exerted by the preloaded tension device, and limiting the further rotational movement of the first housing element relative to the second housing element, when the first and second housing elements are at or near a rotatably opened position.

18. A method in accordance with claim 17 wherein preloading a tension device includes moving a first end of a spring, coupled to the first housing element, further away from a second end of the spring, coupled to the second housing element, along the path of travel of the tension device.

19. A method in accordance with claim 17 wherein releasing the first and second housing elements includes applying an opening force to at least one of the first and second housing elements, which in addition to the force applied by the preloaded tension device, overcomes the holding force applied by the engagement member.

20. A method in accordance with claim 17 wherein, releasing the first and second housing elements includes applying a release force to the engagement member which biases the engagement member in a direction that reduces the holding force below a level where the force applied by the preloaded tension device can overcome the holding force.

21. A method in accordance with claim 17 wherein limiting the further rotational movement at or near a rotatably opened position includes a first physical structure associated with the first housing element intersecting a second physical structure associated with the second housing element.

22. A method in accordance with claim 21 wherein a first physical structure intersecting a second physical structure includes the first physical structure coming into contact with the second physical structure.

23. A method in accordance with claim 22 wherein the first physical structure comes into contact with the second physical structure via a shock absorber.

* * * * *